United States Patent
Chang et al.

(10) Patent No.: US 8,260,939 B2
(45) Date of Patent: Sep. 4, 2012

(54) SYSTEM AND METHOD FOR SCHEDULING WIRELESS CHANNEL RESOURCES

(75) Inventors: Henry Chang, San Diego, CA (US); Doug Dunn, Chula Vista, CA (US)

(73) Assignee: KYOCERA Corporation, Kyoto (JP)

( * ) Notice: Subject to any disclaimer, the term of this patent is extended or adjusted under 35 U.S.C. 154(b) by 1140 days.

(21) Appl. No.: 11/380,873

(22) Filed: Apr. 28, 2006

(65) Prior Publication Data

US 2007/0255839 A1    Nov. 1, 2007

(51) Int. Cl.
*G06F 15/16* (2006.01)

(52) U.S. Cl. ........ 709/229; 709/228; 709/238; 709/217; 709/220; 709/227; 370/294; 370/401; 370/331; 455/464; 455/500; 455/436

(58) Field of Classification Search .................. 709/238, 709/226, 217, 220, 227, 224, 228–229; 370/294, 370/401, 220, 352, 331; 455/464, 500, 517, 455/406, 436; 454/464, 500, 436
See application file for complete search history.

(56) References Cited

U.S. PATENT DOCUMENTS

| | | | |
|---|---|---|---|
| 5,857,147 A | 1/1999 | Gardner et al. | |
| 6,108,314 A * | 8/2000 | Jones et al. | 370/294 |
| 6,810,427 B1 * | 10/2004 | Cain et al. | 709/238 |
| 6,885,859 B2 | 4/2005 | Karaoguz et al. | |
| 7,068,624 B1 * | 6/2006 | Dantu et al. | 370/331 |
| 2002/0101837 A1 | 8/2002 | Bender et al. | |
| 2002/0118663 A1 | 8/2002 | Dorenbosch et al. | |
| 2003/0166408 A1 * | 9/2003 | Zhang et al. | 455/522 |
| 2004/0114606 A1 | 6/2004 | Haddad | |
| 2005/0063409 A1 * | 3/2005 | Oommen | 370/432 |
| 2005/0265323 A1 | 12/2005 | Thermond | |
| 2006/0062192 A1 | 3/2006 | Payne, III | |
| 2006/0229094 A1 * | 10/2006 | Huh et al. | 455/518 |

FOREIGN PATENT DOCUMENTS

WO    WO 98/38753    3/1998

* cited by examiner

*Primary Examiner* — Wing Chan
*Assistant Examiner* — Benjamin M Thieu

(57) ABSTRACT

A system and method are provided for enabling and performing scheduling for wireless devices supporting multiple users or devices. The system has a wireless subscriber device that is enabled to support multiple users or devices. The wireless system may operate accordingly to a wireless air interface such as WCDMA, CDMA2000, GSM, or other wireless technology. The wireless device has a message generator, which is configured to generate a multi-user message. The device transmits the multi-user message to the network. The network receives the multi-user message and begins to schedule network resources to the device as a device supporting multiple users.

18 Claims, 4 Drawing Sheets

SYSTEM AND METHOD FOR SCHEDULING WIRELESS CHANNEL RESOURCES

FIELD OF THE INVENTION

The present invention relates generally to the field of wireless networks and subscriber devices, and more particularly to scheduling network resources for the wireless subscriber units.

BACKGROUND OF THE INVENTION

Wireless subscriber devices are widely used and have become an essential aspect of modern life. Wireless subscriber devices such as pagers, mobile phones, PDA's (personal data assistants) are used for work, for personal activities, and as a way to keep in contact with friends and family. As the functionality of these devices increases, their use and acceptance continues to expand. Further, users have become more reliant upon their wireless devices, and therefore demand high quality service and performance.

The quality of service provided by these wireless devices depends in part on the transmission characteristics of the wireless networks they access. The wireless network and its associated infrastructure may determine, for example, the channel transmission speed, power, or number of time slots allocated to any particular subscriber unit. In this way, some remote devices may have communication channel access that provides an exceptional quality of service, while others may be assigned channel access that provides a disappointing or even unacceptable level of service. Users have an expectation that the wireless networks they connect to will allow them to access the functionality of their wireless devices without excessive delays, interruptions, or compromised quality of service. In the current competitive market of wireless network providers, a company's reputation and brand is mostly determined by the quality of service that the network provides to wireless devices.

Some wireless devices allow multiple users to share a single network connection. For example, a wireless router device may allow multiple users to access a shared wireless data connection. Such a device may have a wireless data modem or other network-enabled device to establish a data or voice connection to the network. Multiple users are also connected to the wireless router, and each user is able to share the network connection. The multiple users may connect to the wireless router using a cable connection, or in some cases, may connect through local wireless communication. Currently, even if a wireless router device is capable of enabling multiple users, the device is typically treated as a single user by the wireless network. The network does not take into account that the device is requesting resources on behalf of multiple users. Accordingly, with multiple active users sharing a single device, each user receives only a fraction of the network resources that a user with a direct network connection receives. In some cases, this sharing of resources may lead to an undesirable experience for the users sharing the network connection through the router.

Unfortunately, the known process for allocating network resources to wireless devices that can support multiple users leads to an unsatisfactory user experience. Users sharing a network connection are far more likely to experience slow service and interruptions in service than users with their own network connection. If service from a particular network provider is poor, it is likely that users will switch wireless network providers. Therefore, wireless network providers have a need for an improved system and method for enabling and performing scheduling for wireless devices supporting multiple users.

SUMMARY OF THE INVENTION

Briefly, the present invention provides a system and method for enabling and performing scheduling for wireless devices supporting multiple users or devices. The system has a wireless subscriber device that is enabled to support multiple users or devices. The wireless system may operate accordingly to a wireless air interface such as WCDMA, CDMA2000, WiMax, or other wireless technology. The wireless device has a message generator, which is configured to generate a multi-user message. The device transmits the multi-user message to the network. The network receives the multi-user message and begins to schedule network resources to the device as a device supporting multiple users.

In a particular example, the wireless subscriber device is a wireless router that allows multiple users to share a network connection. These users may connect to the wireless router using direct connections, or may connect through a local area wireless connection such as 802.11. The router may have a removable or integral data card for establishing wireless communication with the network, or may connect to a separate wireless subscriber device. At a predetermined time, or responsive to an inquiry by the network, the router generates and sends a multi-user message to the network indicating that it supports multiple users. In some cases, the message may indicate the total number of users or devices supported, or may indicate the actual number of active users. The network receives the multi-user message and schedules network resources to the device in proportion to the number of users it is supporting.

Advantageously, the present system enables the wireless network to provide users an improved quality of service, even when accessing the network through a multi-user device. Since the remote wireless device reports its multi-user capability to the network, the network is able to schedule network resources according to the number of users served through that single connection. In this way, the quality of service to the users sharing a network connection is improved.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF THE INVENTION

Figure 1:
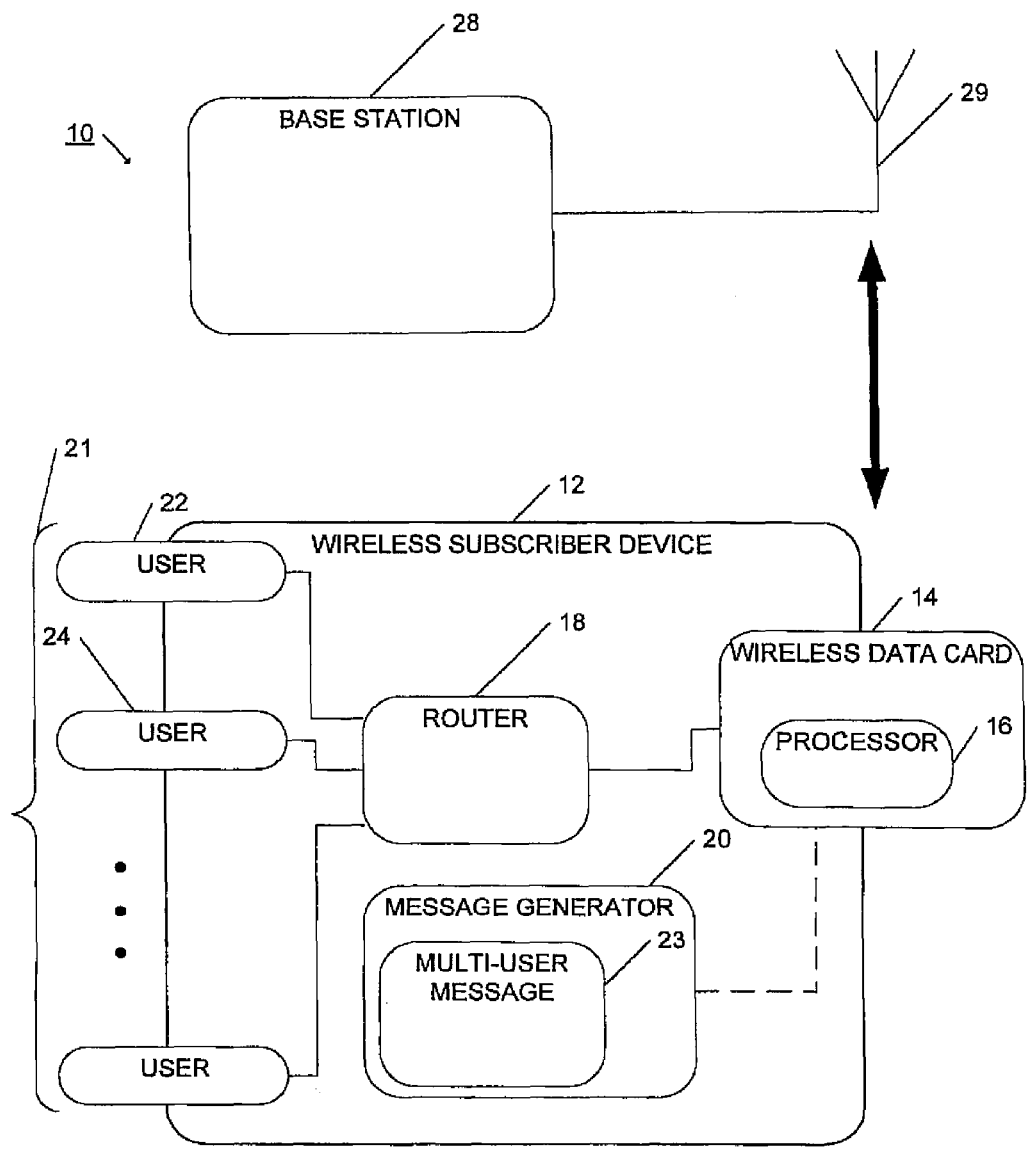
FIG. 1 is a block diagram of a system for enabling multi-user device scheduling in accordance with the present invention.

Referring now to FIG. 1, system 10 for enabling multi-user device scheduling is illustrated. System 10 has wireless subscriber device 12 configured to communicate with base station 28. Wireless subscriber device 12 may be, for example, a wireless handset, a wireless personal data assistant, a portable computer, a wireless router, or other wireless device. It will be appreciated that wireless subscriber device 12 may be a discrete device, or may be integrated into another device. For example, wireless subscriber device 12 may be a mobile module operating in a vehicle.

Wireless subscriber device 12 has wireless data card 14, which is configured to receive wireless communications from and transmit wireless communications to base station 28. It will be appreciated that wireless data card 14 may operate according to international communication standards such as CDMA2000, UMTS, GSM, EDGE, PHS, or other existing or evolving communication standards. It will also be appreciated that wireless data card 14 may operate according to data transfer standards such as Bluetooth®, IEEE 802.11, WiMax or a proprietary standards. It will be appreciated that wireless data card 14 may be built into (i.e., integral with) wireless subscriber device 12 or it may be removable. For example, wireless data card 14 may be a card which can be inserted into and removed from a portable computer. Wireless data card 14 typically has processor 16 for controlling the card's operation. It will be appreciated that processor 16 may be a single device or that its functionality may be distributed among two or more processing devices, or the processor functionality may be provided by a gate array or other programmable logic device.

Wireless subscriber device 12 can support multiple users or devices 21. It will be appreciated that the multiple users 21 represent entities or devices accessing network resources through wireless subscriber device 12. It will be appreciated that the users may be, but are not limited to being, other devices accessing network resources through wireless subscriber device 12 or may represent a device operating an application that accesses network resources. For example, user 22 may be operating a voice communication, a voice over IP communication, a data transmission, or other communication according to known standards, with the user sharing a network connection with other users or other user's applications through wireless device 12. In another example, user 24 may have a data transmission or other communication process running on portable computer accessing network resources through wireless subscriber device 12.

Wireless subscriber device 12 has message generator 20 for generating multi-user message 23. It will be appreciated that message generator 20 may be implemented as hardware, firmware, or software, and in some cases, may be operated on processor 16. It will be appreciated that the functionality of message generator 20 may be accomplished by one device or distributed across two or more devices. Message generator 20 accumulates information on various users 21. This information may include, but is not limited to, the current number of active users and the maximum number of active users that wireless subscriber device 12 is able support at one time. Message generator 20 may also accumulate information on whether active users qualify for increased quality of service because of premium status. Users might qualify for premium status by paying an additional fee or by any other means established by the network. Message generator 20 generates multi-user message 23 including some or all of the information on various users 21. Multi-user message 23 is transmitted by wireless data card 14 to base station 28.

The structure of wireless messages is known in the art and will not be discussed in detail. However, generally, each communication standard such as CDMA, WCDMA, UMTS, GSM, EDGE, PHS, Bluetooth®, IEEE 802.11, and WiMax has a detailed and specific structure for the wireless communications it describes. Certain segments or fields of each message are dedicated to transmitting specific pieces of information. For example, the first few bits of a digital message might be reserved for indicating the identification of the entity transmitting the message. Currently, the standards do not provide a field or space in the message for indicating that wireless subscriber devices can or are supporting more than one user. It will be understood that multi-user message 23 may be incorporated into existing messages described by wireless communication standards or that it may be added as a new message to the standards. For example, space in an existing message may be allocated to indicate that wireless subscriber devices can support multiple users. In another example, an entirely new message may be added to the standard for communicating that wireless subscriber devices can support multiple users. Additional message space may be allocated to distinguish between a maximum number of users and an actual number of active users. It will be appreciated that other multi-user information may be conveyed in multi-user message 23.

Advantageously, message generator 20 and multi-user message 23 transmit the multi-user message to the network, thereby enabling base station 28 to schedule resources according to the number of supported or actual users. Various users 21 accessing network resources through wireless subscriber device 12 can receive service comparable to users that don't share a network connection. The quality of service to various users 21 sharing a network connection may increase, and a more consistent user experience is enabled. The user satisfaction with wireless subscriber devices that support multiple users increases as well.

Base station 28 is a base station in a traditional cellular arrangement. Base stations are known in the art and will not be discussed in detail. However, generally, base stations are responsible for scheduling network resources amongst and providing network resources to wireless subscriber devices. Base station 28 has antenna 29 for communicating with wireless subscriber device 12. This communication may conform to any communication standard such as CDMA2000, UMTS, GSM, EDGE, PHS, or other existing or evolving communication standards. It will also be appreciated that communication between base station 28 and wireless subscriber device 12 may operate according to data transfer standards such as Bluetooth®, IEEE 802.11, WiMax, or other proprietary standards. Responsive to receiving multi-user message 23, which indicates that wireless device 12 can support or is supporting multiple users, base station 28 alters the way it schedules resources to wireless subscriber device 12.

Wireless subscriber device 12 has an internal router 18. Routing technology and processes are known in the art and will not be discussed in detail. However, generally, a router directs the flow of communication or data signals between or among multiple users operating from wireless device 12. Router 18 directs the communications received by wireless data card 14 to various users 21, and manages the flow of information to and from each user. This "one-to-many" arrangement allows a single communication connection to be shared by multiple sessions. Router 18 also directs the communications from various users 21 to wireless data card 14. It will be appreciated that the functionality of router 18 may be accomplished in hardware, firmware, or software. It will be appreciated that router 18 may be a discrete unit or that its functionality may be distributed amongst two or more devices. It will be appreciated that the routing function of router 18 may be performed according to any known routing technique such as routing by IP address, MAC address, device identification, or any other routing technique.

Figure 2:
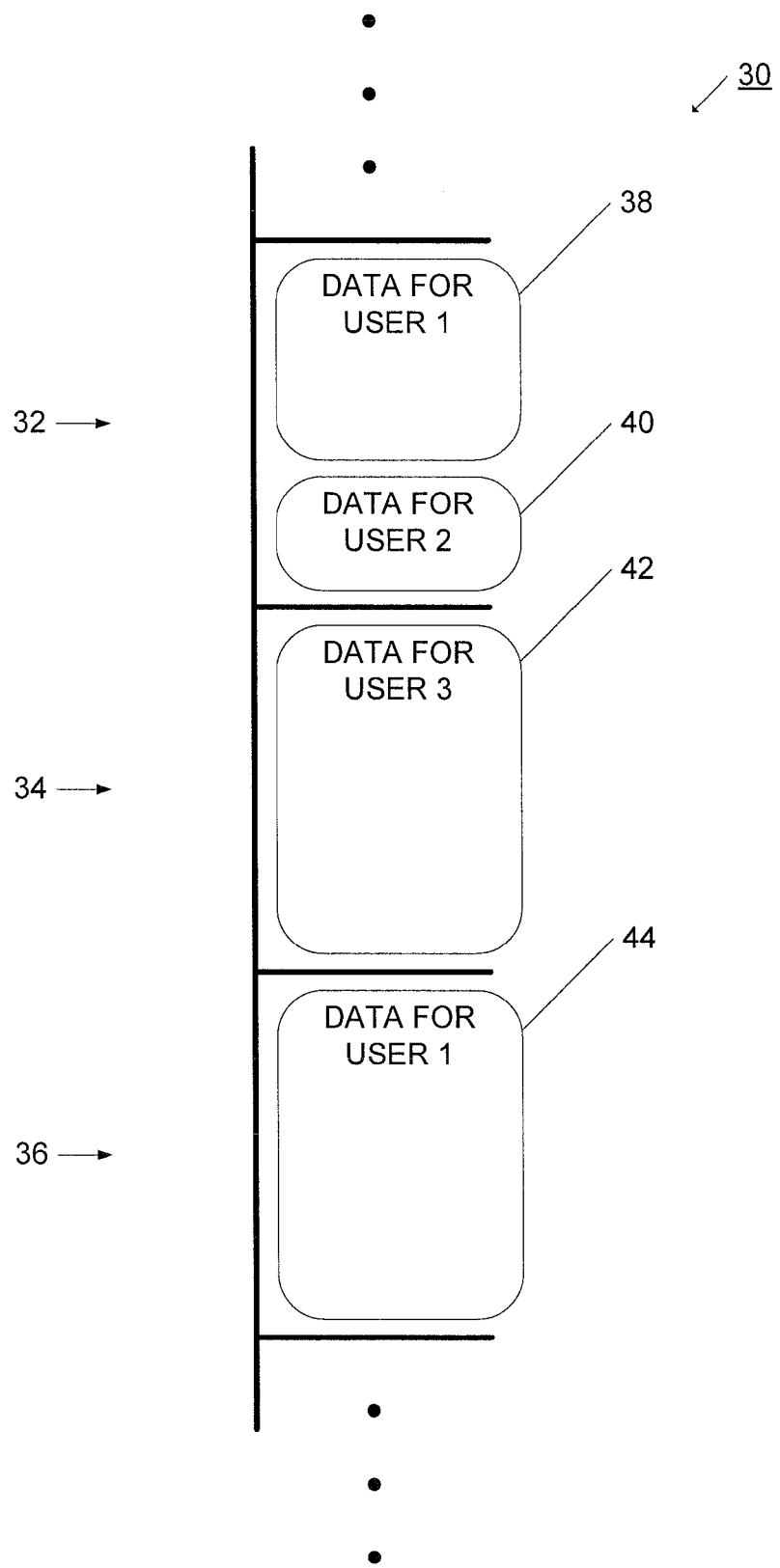
FIG. 2 is an illustration of a process for multi-user device scheduling in accordance with the present invention.

Referring now to FIG. 2, method 30 for multi-user device scheduling is illustrated. Scheduling data transfer in a wireless network by allocating time slices to different devices is known in the art and will not be discussed in detail. However, generally, the time during which data is transferred from a base station to a wireless subscriber device is divided into discrete timeslices. Generally, the network scheduler determines which device or devices will receive data during each timeslice. For example, currently the network scheduler may determine the allocation of time slices from the RF conditions reported back to the network from the device or the type of application the device is using. In method 30, the network scheduler initiates multi-user scheduling as shown in blocks 32, 34, and 36. Initiation of multi-user scheduling may occur responsive to a multi-user message, responsive to determining that the device can support multiple users, responsive to determining that the device supports one or more premium sessions, or responsive to any other stimulus indicating that multi-user scheduling is appropriate. As illustrated in FIG. 2, the network has scheduled multiple timeslices (32, 34, & 36) to three users active on a single wireless router device. The three users are sharing a single network connection, but as the network is aware that multiple users are sharing the connection, the network is enabled to allocate additional network resources to support the multiple users. As illustrated, user 1 receives data 38 and 44 in timeslices 32 and 36, while user 2 receives a small amount of data 40 in timeslice 32, and user 3 receives data 42 in timeslice 34. In most cases, the network has sufficient data to send to each user so that the data for one user fills a timeslice, as shown by timeslices 34 and 36. However, in some cases, data may be sent to a user, but some additional space (or time) is available in the timeslice. To improve efficiency, that unused portion of the timeslice may be assigned to another user, as shown by timeslice 32.

Multi-user scheduling may include allowing multiple users that are active on a wireless router to receive data in the same timeslice. Since these users share a network connection on the same wireless routing device, the network is able to better utilize partially filled timeslices as shown in block 34. When the data transmitted from a base station to one of the users does not entirely fill a slice, there is transmission time at the end of the slice left open. For example, if a multi-user wireless device is operating in a high-data-rate location, and one of the device's users is scheduled to receive a small amount of data, then the network may send the data in a timeslice that may not be fully used. To increase network efficiency, the network may determine if another user on the multi-user device is also queued for data. If so, the extra space in the timeslice may be used to send data to another user on the same multi-user device. Filling the rest of the slice with data for a different user on the same multi-user device increases the data throughput of the network. Of course, if no other user on the multi-user device is queued for data, then the network may use known processes to allocate the extra space to another wireless device.

Multi-user scheduling may include the step of allocating more slices to the device supporting multiple or premium services as shown in block 36. For example, a device supporting three active users might be allocated three times as many slices as a single-user device. In another example, a device supporting a premium user service might be allocated twice as many slices as a device supporting a non-premium session. In one example, a premium service is a service for which a user pays an additional fee. Although the discussion of method 30 has been with reference to timeslices, it will be understood that other forms of multiple access may be used. For example, some network technologies use a code spreading or other process as a way to organize communication channels. In the case of code spreading, rather than allocating additional timeslices, additional codes or channels may be allocated responsive to the multi-user message.

Figure 3:
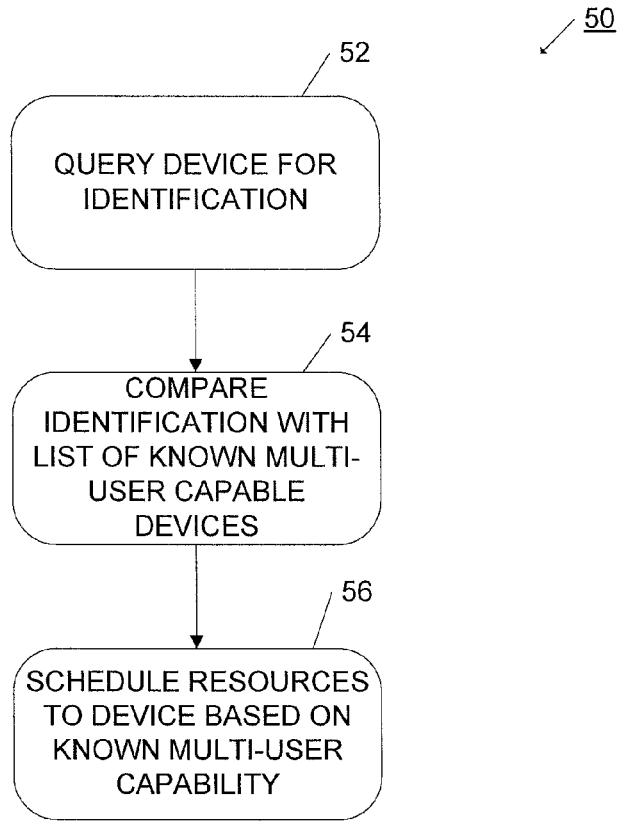
FIG. 3 is a flow chart of a process for enabling multi-user device scheduling in accordance with the present invention.

Referring now to FIG. 3, method 50 for enabling multi-user device scheduling is illustrated. Method 50 begins with a base station querying a wireless subscriber device for its identification as shown in block 52. It will be understood that this query can be executed during registration, authentication, call set up or any other time during communication between the base station and the wireless subscriber device. For example, as a wireless router powers up and requests network attention, a base station may query the wireless router for its identification. In another example, when a wireless handset requests to set up a voice communication through an integral wireless router, the base station may query the wireless router for its identification. After receiving the device identification from the wireless router, the base station compares the device's identification with a list of identifications for devices that can support multiple users or premium user sessions as shown in block 54. For example, the base station might store a list of device identifications that have already been determined to correspond to wireless routers that support multiple users. The base station may use any indexing or searching algorithm to compare the received device identification with those already in the list. The base station then initiates multi-user scheduling if the device identification received from the wireless subscriber device matches any of the identifications on the list as shown in block 56. For example, if the base station queries and receives the device identification of a wireless router and determines that the wireless router's identification matches an element of the list of known multi-user capable devices, the base station will allocate additional network resources to the wireless router in proportion to the number of users it supports.

Figure 4:
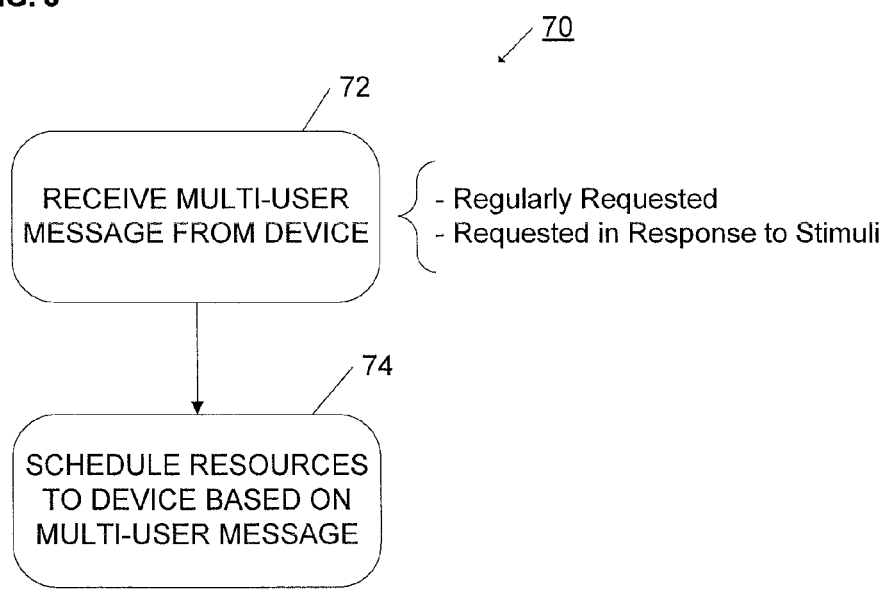
FIG. 4 is a flow chart of another process for enabling multi-user device scheduling in accordance with the present invention.

Referring now to FIG. 4, method 70 for enabling multi-user device scheduling is illustrated. Method 70 begins with a base station receiving a multi-user message as shown in block 72. It will be understood that the multi-user message may be received responsive to a request from the base station or without a prior request from the base station. For example, a wireless router that can support multiple sessions might send an unsolicited multi-user message to the base station when the number of active sessions that it supports increases or decreases. In another example, a wireless subscriber device might send a multi-user message to the base station when the base station requests a multi-user message responsive to a time signal, responsive to a change in network activity, or responsive to other stimuli. After receiving a multi-user message, the base station enables multi-user scheduling according to the contents of the multi-user message as shown in block 74. For example, if the message indicates that a wireless subscriber device is only supporting one non-premium user, the base station may turn off multi-user scheduling to the device. At a later time, the multi-user message may indicate that multiple users are active, and the network may respond by allocating or scheduling additional network resources. These resources may include additional time slices, additional power, or additional codes, dependent on the specific wireless technology uses.

Figure 5:
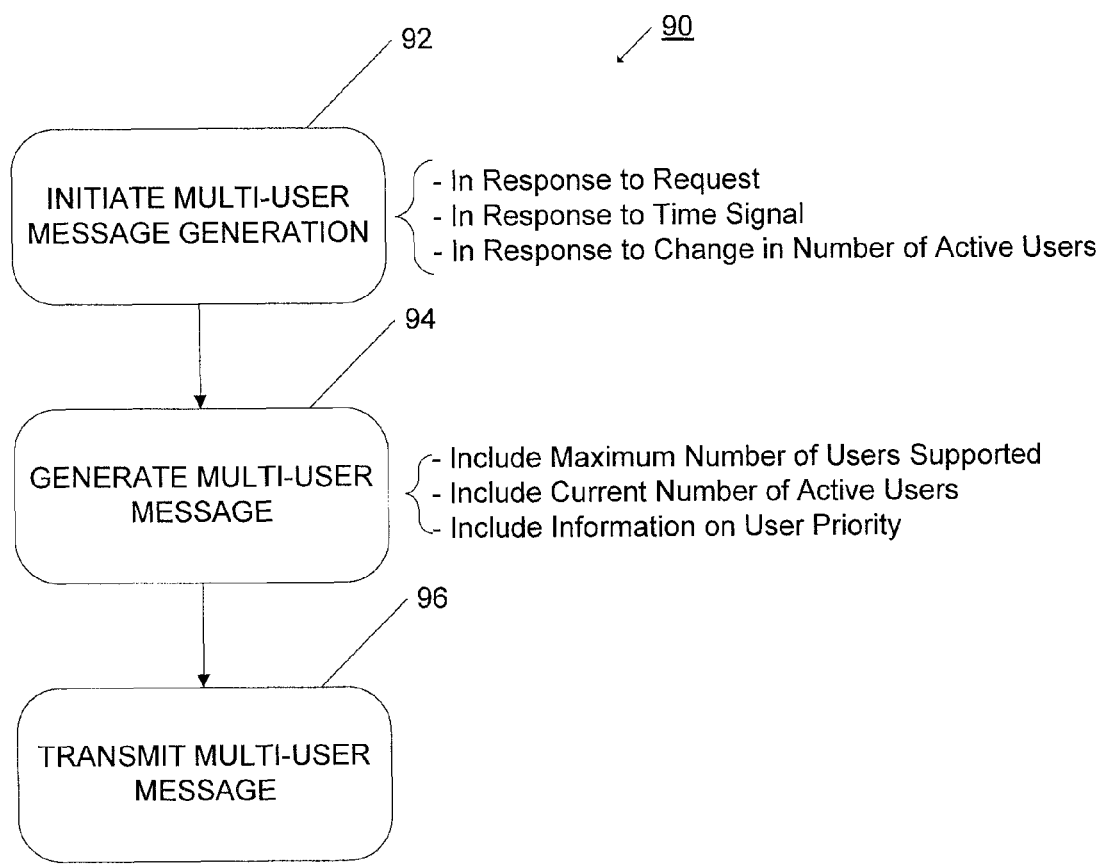
FIG. 5 is a flow chart of a process for generating a multi-user message in accordance with the present invention.

Referring now to FIG. 5, method 90 for generating a multi-user message is illustrated. In method 90, the message generator initiates multi-user message generation as shown in block 92. It will be understood that the message generator may initiate message generation responsive to a request from a base station, responsive to a regular time signal, responsive to a change in the number of active sessions, or responsive to any other stimulus.

After initiation, the message generator will generate the multi-user message as shown in block 94. It will be understood that the message generator may include in the multi-user message the maximum number of users that the wireless subscriber device can support, the current number of active users that the wireless subscriber device supports, the premium status of the users supported, or other information. For example, the multi-user message may indicate that the wireless subscriber device is currently supporting five active users. After the multi-user message is generated, it is transmitted to the base station as shown in block 96.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claimed is:

1. A wireless subscriber device comprising:
   a processor, configured to generate a multi-user message that comprises
   an indication that the wireless subscriber device supports multiple user devices for a plurality of users, an indication of a number of active users devices accessing the wireless subscriber device, and an indication of a maximum number of user devices the wireless subscriber device can support;
   a wireless data card, operatively coupled to the processor, configured to transmit the multi-user message to a base station over a single connection, and receive from the base station, over the single connection, a wireless communication comprising a plurality of multiple access channels corresponding to resources assigned by the base station to the plurality of active user devices and containing data for the active user devices; and
   a router, operatively coupled to the wireless data card, configured to allocate the data to the plurality of active user devices.

2. The wireless subscriber device of claim 1, the processor further configured to generate the multi-user message in response to a request received from the base station.

3. The wireless subscriber device of claim 1, the processor further configured to generate the multi-user message in response to a time signal.

4. The wireless subscriber device of claim 1, the processor further configured to generate the multi-user message in response to a change in the number of active user devices connected to the wireless subscriber device.

5. The wireless subscriber device of claim 1, the multi-user message further comprising an indication of a premium status of at least one user of the plurality of users.

6. A method of scheduling resources in a wireless communication system, the method comprising:
   transmitting a multi-user message from a wireless subscriber device to a base station over a single connection, the multi-user message comprising an indication that the wireless subscriber device supports multiple user devices for a plurality of users, an indication of a number of active user devices accessing the wireless subscriber device, and an indication of a maximum number of user devices the wireless subscriber device can support;
   allocating communication resources to the wireless subscriber device according to the multi-user message;
   receiving a wireless communication from the base station over the single connection, comprising a plurality of multiple access channels corresponding to the allocated communications resources assigned by the base station to a plurality of user devices and containing data for the user devices; and
   allocating, via a router of the wireless subscriber device, the data to the appropriate user devices of the plurality of user devices connected to the wireless subscriber device.

7. The method of claim 6, further comprising:
   receiving the multi-user message from a database.

8. The method of claim 6, the step of allocating communication resources to the wireless subscriber device according to a multi-user message, comprising:
   allocating time based resources to the wireless subscriber device according to the multi-user message.

9. The method of claim 8, further comprising:
   combining data for at least two of the plurality of user devices into a single time based resource of the allocated time based resources.

10. The method of claim 6, the step of allocating communication resources to the wireless subscriber device according to a multi-user message, comprising:
    allocating the communication resources to the wireless subscriber device according to a premium status of at least one user device of the plurality of user devices.

11. The method of claim 6, the step of allocating communication resources to the wireless subscriber device according to a multi-user message, comprising:
    allocating code division based resources to the wireless subscriber device according to the multi-user message.

12. A method for enabling multi-user device scheduling by a base station, comprising:
    receiving a multi-user message from a wireless subscriber device, comprising an indication that the wireless subscriber device supports multiple user devices for a plurality of users, an indication of a number of active user devices accessing the wireless subscriber device, and an indication of a maximum number of user devices the wireless subscriber device can support;
    scheduling resources for the number of active user devices by creating a plurality of multiple access channels corresponding to the resources, and assigning appropriate multiple access channels to the active user devices over a single network connection of the wireless subscriber device; and
    sending data for the active user devices to the wireless subscriber device using the multiple access channels over the single network connection.

13. The method of claim 12, further comprising:
    querying the wireless subscriber device for a device identification;
    receiving the device identification in the multi-user message;
    comparing the device identification with a list of device identifications that correspond to devices capable of supporting multiple users; and
    enabling the scheduling of resources for the number of active users if the device identification matches a device identification from the list of multiple user supporting devices.

14. The method of claim 13, further comprising:
    comparing the device identification with a list of device identifications that correspond to devices capable of supporting premium user sessions; and enabling scheduling of resources for the number of active users if the device identification matches a device identification from the list of premium session supporting devices.

15. The method of claim 12, further comprising:
receiving multi-user information in the multi-user message received from the wireless subscriber device; and
enabling scheduling of resources for the number of active users if the multi-user information indicates that the wireless subscriber device is capable of supporting multiple active users.

16. The method of claim 12, further comprising:
receiving multi-user information in the multi-user message received from the wireless subscriber device; and
enabling scheduling of resources for the number of active users if the multi-user information indicates that the wireless subscriber device is currently supporting multiple active users.

17. A wireless subscriber device comprising:
a processor, configured to generate a multi-user message in response to a change in a number of active user devices accessing the wireless subscriber device, the multi-user message comprising an indication that the wireless subscriber device supports multiple user devices for a plurality of users, an indication of the number of active user devices accessing the wireless subscriber device, and an indication of a maximum number of user devices the wireless subscriber device can support;
a wireless data card, operatively coupled to the processor, configured to transmit the multi-user message to a base station over a single connection, and receive from the base station, over the single connection, a wireless communication comprising a plurality of multiple access channels corresponding to resources assigned by the base station to the plurality of active user devices and containing data for the active user devices; and
a router, operatively coupled to the wireless data card, configured to allocate the data to the plurality of active user devices.

18. A method of scheduling resources in a wireless communication system, the method comprising:
transmitting a multi-user message from a wireless subscriber device to a base station over a single connection, the multi-user message comprising an indication that the wireless subscriber device supports multiple user devices for a plurality of users, an indication of a number of active user devices accessing the wireless subscriber device, and an indication of a maximum number of user devices the wireless subscriber device can support;
allocating communication resources to the wireless subscriber device according to the multi-user message;
receiving a wireless communication from the base station over the single connection, comprising a plurality of time based multiple access channels corresponding to the allocated communications resources assigned by the base station to a plurality of user devices and containing data for the user devices with combined data for at least two of the plurality of user devices combined onto a single time based multiple access channel; and
allocating, via a router of the wireless subscriber device, the data to the appropriate user devices of the plurality of user devices connected to the wireless subscriber device.

* * * * *